United States Patent [19]

Takata et al.

[11] Patent Number: 4,588,124
[45] Date of Patent: May 13, 1986

[54] HEAT-EXCHANGING SYSTEM FOR AN ENCLOSED SPACE

[75] Inventors: Junzo Takata; Michio Jinushi; Mitsuo Hashizume; Mitsugu Kobayashi, all of Kanagawa, Japan

[73] Assignees: Takenaka Komuten Co., Ltd., Osaka; Nankoso Company Ltd., Kanagawa, both of Japan; a part interest

[21] Appl. No.: 657,364

[22] Filed: Oct. 3, 1984

[30] Foreign Application Priority Data

Oct. 4, 1983 [JP] Japan ............................. 58-185622
Oct. 4, 1983 [JP] Japan ............................. 58-185623
Oct. 4, 1983 [JP] Japan ............................. 58-185624

[51] Int. Cl.$^4$ ............................................. F24D 3/00
[52] U.S. Cl. ................................. 237/1 R; 165/53; 62/259.1; 62/259.4; 237/2 A; 237/56; 237/59; 52/169.7
[58] Field of Search ............... 165/53, 54; 237/1 R, 237/2 A, 56, 59; 126/431; 62/259.1, 304; 52/169.7

[56] References Cited

U.S. PATENT DOCUMENTS

| | | | |
|---|---|---|---|
| 964,464 | 7/1910 | Crawford-Frost | 62/259.4 |
| 1,322,803 | 11/1919 | MacFadden | 237/56 |
| 1,808,829 | 6/1931 | Barnes | 62/259.4 |
| 2,187,954 | 1/1940 | Smith | 62/259.4 |
| 3,949,732 | 4/1976 | Reines | 126/431 |
| 4,000,850 | 1/1977 | Diggs | 165/53 |
| 4,003,365 | 1/1977 | Wiegand et al. | 126/540 |

FOREIGN PATENT DOCUMENTS 2102937  2/1983  United Kingdom ............. 62/259.1

Primary Examiner—Albert W. Davis, Jr.
Attorney, Agent, or Firm—Kalish & Gilster

[57] ABSTRACT

A heat-exchanging system for an enclosed space having wall-forming members, pipes provided on said members, and being adapted for discharging water for flow along the surfaces of the same, a source of water, a pump connecting said source and said pipes, ducts for returning water to said source, and a temperature sensor controlling the operation of said pump whereby said members serve as a heat exchanger for both heating and cooling purposes in response to predetermined temperatures.

12 Claims, 4 Drawing Figures

HEAT-EXCHANGING SYSTEM FOR AN ENCLOSED SPACE

BACKGROUND AND SUMMARY OF THE INVENTION

The present invention relates to a heat-exchanging system for an enclosed space, which is adapted to control the temperature inside a space by utilizing the inner surfaces defining and enclosingly surrounding the space, or to a heat-exchanging system for heating or cooling an interior space of a building, such as a room provided with a swimming pool, a refrigerated storage volume, a portable refrigerator, or a public bath. More particularly, the present invention relates to a heat-exchanging system wherein a refrigerant, such as warm water or cold water, is permitted to run down, or flow along, the inner surfaces of the walls defining the space of a building so that such inner surfaces of the enclosed space or the sidewalls of a space within a building may function as a heat exchanger for heating or cooling purposes.

Heretofore, there has been proposed a heating system such as illustrated in FIG. 1 for heating a room provided with a swimming pool. Therein, 1 indicates a building provided with an indoor swimming pool 2 formed in the floor thereof. Floor 3, which is preferably concrete, adjacent the pool has embedded therein a heating pipe 4 of a zigzag formation. Both ends of pipe 4 are connected to one side of a conventional heat exchanger 5. Within the passage connecting pipe 4 and heat exchanger 5 there is provided, in series, a pump 6 for circulating the particular refrigerant. The opposite side of heat exchanger 5 is connected to a boiler 7. The operation of pump 6 causes the refrigerant within pipe 4 to circulate in the direction indicated by an arrow in FIG. 1 through said one side of heat exchanger 5. The circulation of the refrigerant heats the floor within which there is embedded the pipe, and raises the surface temperature thereof. The heated floor surface is then caused to emit heat rays, which radiation heats the swimming room.

Such a system is referred to as a heated-water floor panel heating system and is effective in elevating the average radiation temperature as such employs warm water as refrigerant. But the same is not free from the following deficiencies:

(a) The initial cost is very high and it limits the equipment area.

(b) There is the danger that water may leak from the embedded pipe.

(c) As this system heats the floor surface indirectly from within the concrete, it is required to maintain the temperature of the water circulating within the pipe at about 40° C. to 45° C. in order to maintain the floor surface warm enough for radiation heating. This means that this system fails to utilize thermal energy efficiently and that the operation thereof is quite costly and, therefore, is uneconomical.

The present invention effectively solves the above noted problems. An object is to provide an economical heat-exchanging system requiring limited initial cost for an enclosed space, wherein a liquid refrigerant is directly permitted to flow over the surfaces defining such enclosed space, within the enclosed space, so that the same function as a heat-exchanging means, whereby it is possible to achieve an efficient and economical use of energy for heating or cooling of the enclosed space.

Another object of the present invention is to provide a heat-exchanging system which is easy to install since any confining sidewall can be used as a heat-exchanging means for the related space.

Still another object of the present invention is to provide an economical heating system of limited initial cost for an indoor swimming pool, whereby a heat source for radiation heating of such swimming pool and the surrounding room may be developed in an economical and facile manner by causing the warm water of a heated swimming pool to be directly applied to the surrounding confronting side wall surfaces for flowing thereover.

THE PREFERRED EMBODIMENT

Figure 1:
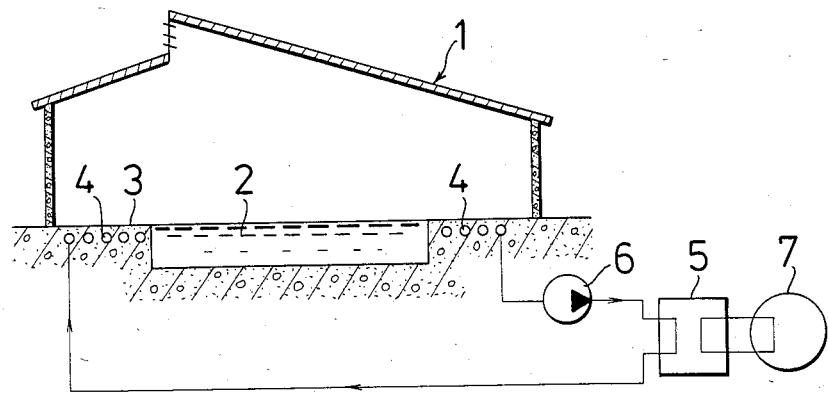
FIG. 1 is a schematic view showing a structure enclosing a swimming pool and incorporating a conventional heating system for said pool and the enclosed space.
Figure 2:
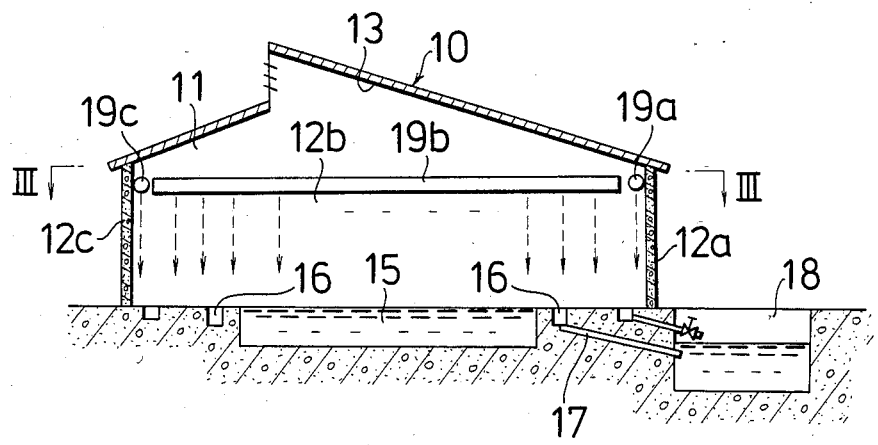
FIG. 2 is a schematic longitudinal sectional view of an enclosed space incorporating a swimming pool provided with a heat-exchanging system constructed in accordance with and embodying the present invention.
Figure 3:
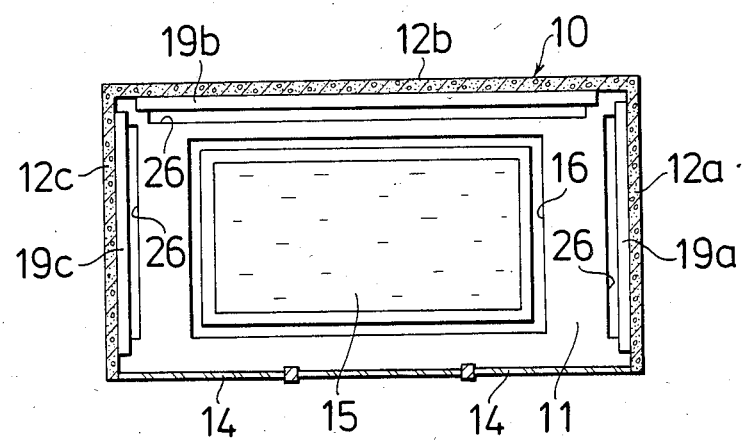
FIG. 3 is a horizontal transverse sectional view taken on the line III—III of FIG. 2.
Figure 4:
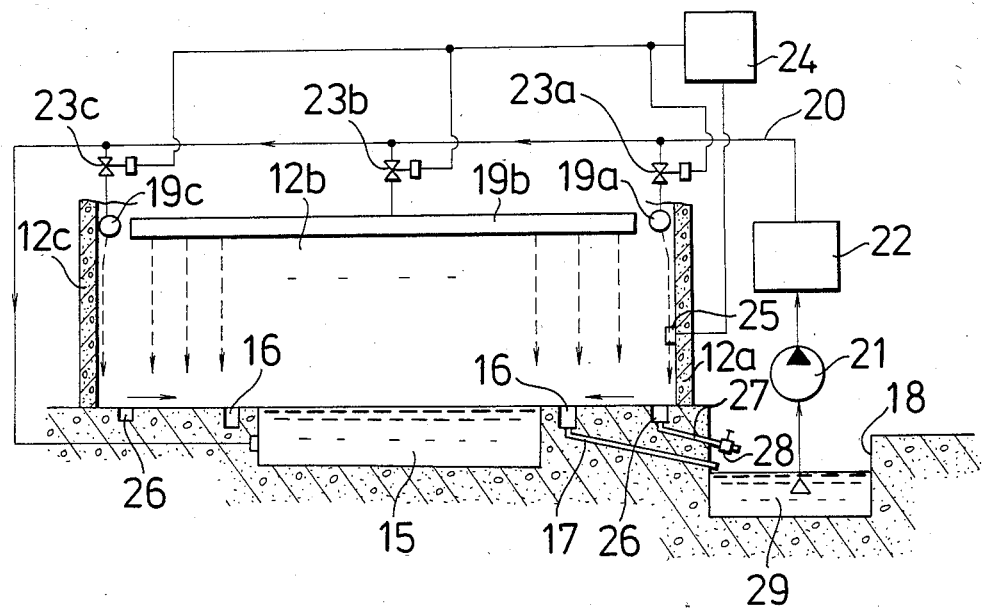
FIG. 4 is a schematic sectional view illustrating the heating system in detail according to the present invention.

Referring now by reference characters to the drawings (FIGS. 2-4) which illustrate the preferred embodiment of the present invention, 10 indicates a building having an indoor swimming pool 15, and 11 generally indicates an enclosed space or so-called swimming room. Three sidewalls 12a, 12b, and 12c and a ceiling 13 of swimming room 11 are constructed of concrete or the like, having not only a thermal storage capability but also provide good heat insulation with their surfaces covered with tiles. The remaining sidewall 14 is constructed of glass plate through which solar energy and sunlight can be introduced into room 11.

Pool 15 is provided within the floor of room 11. In the floor surface surrounding pool 15 there is formed a groove 16 to receive water overflowing from said pool 15. Warm water overflowing into groove 16 is conducted through a conduit 17 into a balancing tank 18 positioned exteriorly of building 10.

The upper portions of sidewalls 12a, 12b, and 12c are respectively provided with pipes 19a, 19b, and 19c for sprinkling heated water. In more detail, said pipes 19a, 19b, and 19c are provided with small holes or slits (not shown) from which warm water is sprinkingly discharged upon the aforesaid sidewalls. Such warm water emanating from said pipes 19a, 19b, and 19c flows downwardly along sidewalls 12a, 12b, and 12c, thereby heating the surfaces of said sidewalls commensurate with the temperature thereof. Heated surfaces of the sidewalls 12a, 12b, and 12c then can function as a heat source for radiation heating.

Pool 15 and balancing tank 18 for storing warm water are connected to a water-supply pipe 20 which is connected to a water-supply pump 21 and a filter 22 fixed in series at the proximate side of balancing tank 18. Water-supply pipe 20 and each of the pipes 19a, 19b, and 19c for sprinkling warm water are respectively connected by means of electromagnetic valves 23a, 23b, and 23c. Said valves 23a, 23b, and 23c are controlled by a control circuit 24 for opening and closing operation. 25 refers to a thermosensor for detecting the surface temperature of sidewall 12a (or 12b, 12c). The signal corresponding to the temperature detected by the sensor 25 is transmitted to control circuit 24, where such is compared with the predetermined degree setting. When the sidewall surface temperature is lower than the predetermined degree setting the electromagnetic valves 23a, 23b, and 23c open; and in the opposite case, close.

26 indicates grooves formed in the floor along the sidewalls 12a, 12b, and 12c, which grooves 26 and balancing tank 18 are connected by a return pipe 27 which is provided with a manual control valve 28.

It should be noted here that the water of pool 15 is warmed by means of a solar collector, a passive-type solar collector or a boiler and that the temperature thereof is maintained between 28° C. and 30° C.

The operation of the above-described system will now be described.

Firstly, the operator makes certain that the temperature of the swimming pool 15 is higher than 29° C. and judges whether or not it is necessary to heat swimming room 11. When such heating is determined necessary, the power supply switch (not shown) is turned on whereby water supply pump 21 is activated and then control circuit 24 and thermosensor 25 are set in an operative state.

When pump 21 commences operation, warm water, as indicated at 29, in balancing tank 18 is pumped for flow through filter 22 and water supply pipe 20 into pool 15 and pipes 19a, 19b, and 19c for sprinkling discharge. When warm water flows through filter 22, any dust or other foreign particles therein are eliminated.

Because the surface temperature of the sidewalls 12a, 12b, and 12c, as a radiation heating source, is lower than the predetermined degree at the beginning of heating operation, a signal is transmitted from the control circuit 24 which excites electromagnetic valves 23a, 23b, and 23c to cause opening thereof. Then part of the warm water flowing within water supply pipe 20 is supplied through valves 23a, 23b, and 23c to each pipe 19a, 19b, and 19c for sprinkling discharge. The warm water flowing into pipes 19a, 19b, and 19c spouts from the small holes or slits toward the respective sidewall 12a, 12b, and 12c and thence flows downwardly along the surfaces thereof. Thus, the surface of each sidewall 12a, 12b, and 12c is heated approximately to the temperature of the warm water, and such heated surface emits radiation heat for heating swimming room 11. The calorie radiation per unit area is relatively small, but a substantial thermal energy may be obtained as a heat source for radiation heating since the total surface area of sidewalls 12a, 12b, and 12c is relatively very large. Therefore the total energy emitted from the said sidewalls serves as a heat source sufficient for heating room 11 and rendering the room conditions comfortable for swimmers.

Warm water that has completed flow downwardly along the surfaces of sidewalls 12a, 12b, and 12c and reaches the room floor and flows into grooves 26. If valve 28 is opened, warm water flows returningly through pipe 27 into balancing tank 18. If valve 28 is closed, warm water will overflow from grooves 26 for flow over the floor towards the pool and thus heats the surface or the floor with the result that the heated surface of the floor radiates heat to elevate the temperature of the room. Further, warm water flowing over the floor surface will flow into groove 16, and thereby be returned to balancing tank 18 via conduit 17.

When the temperature of swimming room 11 has reached an agreeable level and the surface temperature of sidewalls 12a, 12b, and 12c detected by thermosensor 25 has been elevated above the predetermined degree, the signal is cut off and at the same time the electromagnetic valves 23a, 23b, and 23c are closed so that the supply of the warm water to pipes 19a, 19b, and 19c is discontinued and, therefore, sidewalls 12a, 12b, and 12c cease to radiate heat. At this time, the warm water pumped by pump 21 is introduced through water supply pipe 20 into pool 15. When the temperature of the swimming room 11 is lowered and the surface temperature of the sidewalls falls below the predetermined degree, electromagnetic valves 23a, 23b, and 23c open and cause warm water to flow downwardly along said sidewalls 12a, 12b, and 12c so that the latter are heated for radiation heat emission by which the interior of the room 11 is restored to heated condition. The above cycle will thus be repeated as necessary.

As above described, the system of the present invention is manifestly useful whereby the sprinkling of the warm water upon the sidewalls 12a, 12b, and 12c is controlled intermittently depending upon the surface temperatures thereof, with pipes 19a, 19b, and 19c being connected through the electromagnetic valves 23a, 23b, and 23c to water supply pipe 20 thereby establishing the circulation of warm water of the pool. However, the present invention is not limited to this embodiment. For example, it is possible for a pool keeper to control the sprinkling of the warm water by hand after determining the room temperature by himself.

According to the present heating system for a room 11 with an indoor swimming pool 15, the surface of the sidewalls 12a, 12b, and 12c of said room 11 are directly heated by the warm water of the pool. This system has various advantages for example, it is possible to raise the surface temperature of the sidewalls efficiently to the degree necessary for radiation heating of the room; moderately warm water is rendered sufficient to obtain a necessary radiation surface temperature; it is possible to elevate the surface temperature of a large or floor area wall at a moderate cost; and further it is possible to provide comfortable room conditions economically. Moreover, the use of a sidewall (or a floor) within a room for heat radiation purposes in accordance with the present system relatively reduced initial cost and, therefore, is very economical.

Although the foregoing describes the system wherein an interior side wall or a floor is caused to function as a heat source for radiation heating as by the flow thereof of warm water, the present invention is not so limited. For example, if cold water is used instead of warm water, the sidewall or the floor can function as a heat-exchanging means for cooling the interior of the room. The heat-exchanging system according to the present invention can be used to heat or cool the interior not only of a room with an indoor swimming pool but also of a refrigerator warehouse, a portable refrigerator, a public bath or a sauna.

What we claim is:

1. For use in regulating the temperature in an enclosed space having at least one structural wall-forming member having both thermal storage and heat-insulating properties and having an interior surface directed inwardly of the enclosed space not normally intended for directly receiving solar radiation, a heat exchanging system comprising storage means for storing a body of heat exchanging liquid, means for directing flow of heat exchanging liquid downwardly along the interior surface of the wall-forming member, pump means for pumping the heat exchanging liquid from the storage means to the flow directing means for causing flow thereof downwardly along the interior surface of the wall-forming member to cause heat transfer between the wall-forming member and the heat exchanging liquid whereby to maintain a temperature of the wall-forming member commensurate with a temperature of the heat exchanging liquid, thereby to bring about heat transfer between the wall-forming member and the enclosed space for maintaining the enclosed space at a desired temperature, and flow return means for returning to the storage means the heat exchanging liquid which has flowed downwardly along the interior surface of the wall-forming member for cycling of the heat exchanging liquid.

2. A heat exchanging system according to claim 1 wherein the heat exchanging liquid is water.

3. A heat exchanging system according to claim 2 wherein the storage means comprises a swimming pool.

4. A heat exchanging system according to claim 3 wherein the storage means further comprises a balancing tank for receiving the heat exchanging fluid from the return flow means.

5. A heat exchanging system according to claim 4 wherein the return flow means is of groove-defining character and extends along a base of the wall-defining member.

6. A heat exchanging system according to claim 3 wherein there is a floor between the swimming pool and the wall-defining member, the return flow means comprising at least one trough in the floor at a location between the swimming pool and the wall-defining member.

7. A heat exchanging system according to claim 2 wherein the wall-forming member is concrete.

8. A heat exchanging system according to claim 2 wherein the flow directing means comprises a conduit system interconnected with the pump means and including a conduit extending along an upper extent of the wall-forming member and having outlets for sprinkling discharge upon the interior surface of the wall-forming member.

9. A heat exchanging system according to claim 2 wherein the heat exchanging and further comprising temperature sensing means responsive to the surface temperature of the wall-forming member for controlling the pump means as a function of such surface temperature.

10. A heat exchanging system according to claim 9 wherein the body of heat exchanging liquid is part of a water circulatory system for delivery of water to and from a swimming pool, including water warming means associated with such water circulatory system.

11. A heat exchanging system according to claim 9 wherein the water is used for heating of the wall-forming member to provide heating of the enclosed space.

12. A heat exchanging system according to claim 9 wherein the water is used for cooling of the wall-forming member to provide cooling of the enclosed space.

* * * * *

UNITED STATES PATENT AND TRADEMARK OFFICE
CERTIFICATE OF CORRECTION

PATENT NO. : 4,588,124

DATED : May 13, 1986

INVENTOR(S) : Junzo Takata; Michio Jinushi; Mitsuo Hashizume; Mitsugu Kobayashi

It is certified that error appears in the above-identified patent and that said Letters Patent is hereby corrected as shown below:

Claim 9, Line 2, delete the words "wherein the heat exchanging".

Signed and Sealed this

Twenty-sixth Day of August 1986

[SEAL]

Attest:

DONALD J. QUIGG

Attesting Officer

Commissioner of Patents and Trademarks